No. 890,223. PATENTED JUNE 9, 1908.
B. F. DIFFENBAUGH.
SPRING WHEEL.
APPLICATION FILED MAR. 2, 1907.
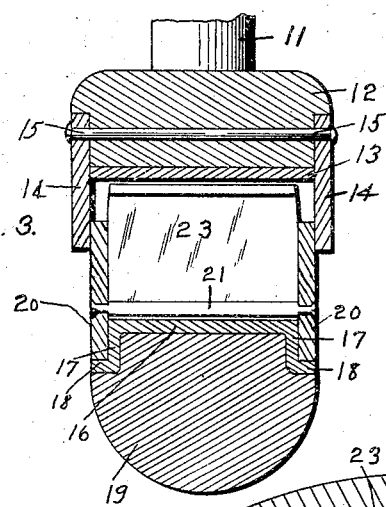
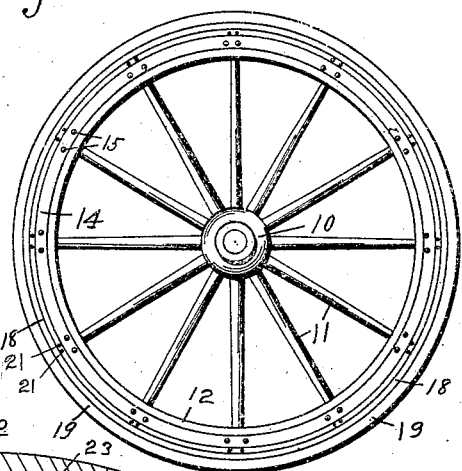
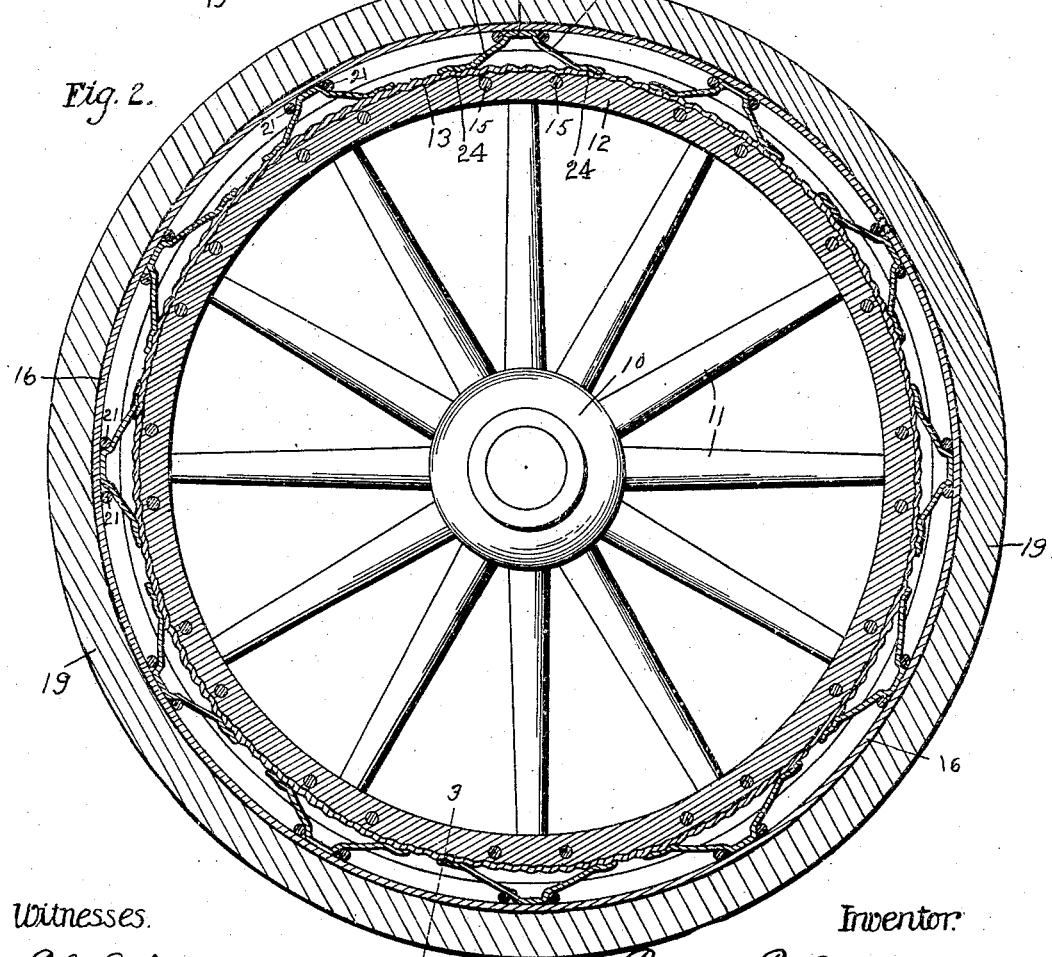
Witnesses.
P. C. Dahlberg.
S. F. Christy.
Inventor:
Benjamin F. Diffenbaugh.
by Irwin & Lane Attys

UNITED STATES PATENT OFFICE.

BENJAMIN F. DIFFENBAUGH, OF CRESTON, IOWA.

SPRING-WHEEL.

No. 890,223.

Specification of Letters Patent.

Patented June 9, 1908.

Application filed March 2, 1907. Serial No. 360,219.

*To all whom it may concern:*

Be it known that I, BENJAMIN F. DIFFENBAUGH, a citizen of the United States, residing at Creston, in the county of Union, and State of Iowa, have invented a certain new and useful Spring-Wheel, of which the following is a specification.

The object of my invention is to provide a spring wheel for vehicles of simple, durable and inexpensive construction in which all of the parts are readily, quickly and easily removable for purposes of repair or replacement and in which a maximum of elasticity is provided.
My invention consists in the construction, arrangement and combination of the various parts of the device, whereby the objects contemplated are attained, as hereinafter more fully set forth, pointed out in my claims and illustrated in the accompanying drawings, in which—

Figure 1 shows a side elevation of a vehicle wheel embodying my invention. Fig. 2 shows a sectional view of the same, and Fig. 3 shows an enlarged, detail, sectional view on the line 3—3 of Fig. 2.

Referring to the accompanying drawings, I have used the reference numeral 10 to indicate the hub, 11 the spokes and 12 the felly, all of which are of the ordinary construction and are preferably made of wood. Secured to the periphery of the felly 12 is a corrugated metal rim 13. Secured to the sides of the felly 12 are two side plates 14 projecting beyond the felly and inclosing the rim 13. These plates are held in position by the rivets 15. The tire of the wheel is formed of a metal tire holder comprising a flat body portion 16 having outwardly extending flanges 17 with laterally projecting margins 18. The tire proper is fitted to the tire holder and is indicated by the numeral 19. It is preferably made of rubber or other yielding material. Two side plates 20 are fitted to the flanges 17 and are designed to stand within the side plates 14. They are held together by means of the rivets 21 which are provided with shoulders to prevent the plates from moving toward each other. These rivets 21 are arranged in pairs, as clearly shown in Fig. 2, and the springs each comprise a part 22 designed to enter between the rivets of each pair and thus be held against movement around the wheel. The ends of each spring diverge from each other at 23 and are corrugated at 24 to engage and fit against the corrugations of the rim 13 to thereby prevent movement of the tire portion around the rim portion. No other fastening device for the spring is required.

In practical use, it is obvious that the tire portion may move toward and from the hub of the wheel and thus cushion the wheel against vibration caused by the tire passing over uneven surfaces. The tire portion is prevented from slipping around the felly portion by means of the rivets 21 on the tire portion and the corrugated ends on the springs engaging the corrugated rim on the felly. These corrugations do not affect the yielding movement of the springs, but simply prevent the tire from creeping upon the felly. If any of the springs should become broken or if for any reason, it is desired to replace any or all of the springs, the operator need only remove one of the plates 14 by loosening the rivets 15, whereupon the entire tire portion, together with the springs may be slipped off from the felly portion and new springs readily and easily inserted. The overlapping plates 14 prevent the entrance of dust or dirt within the spring chamber.

Having thus described my invention, what I claim and desire to secure by Letters Patent of the United States, therefor is—

1. In a spring wheel, the combination of a felly, a corrugated rim on the felly, a tire spaced apart from the felly and a series of leaf springs with their central portions engaging the tire and their ends corrugated and placed in engagement with the said corrugated rim.

2. In a spring wheel, the combination of a felly, a corrugated rim on the felly, a tire spaced apart from the felly, a series of leaf springs with their central portions engaging the tire and their ends corrugated and placed in engagement with the said corrugated rim, side plates for inclosing the springs and rivets for connecting the side plates, said rivets serving to hold the springs against movement around the tire.

3. A spring wheel comprising a felly, a tire spaced apart from the felly, a corrugated rim between the tire and felly, a series of leaf springs with their ends corrugated, and placed in engagement with said corrugated rim, and their central portions arched and in engagement with the adjacent portions of the wheel, side plates for inclosing the spring, and rivets for connecting the side plates, said rivets being so disposed as to engage the springs and prevent their movement around the wheel.

Des Moines, Iowa. February 11, 1907.

BENJAMIN F. DIFFENBAUGH.

Witnesses:
C. A. NIEMEYER,
S. A. VANDER PLUIJAN.